(12) United States Patent
Roach et al.

(10) Patent No.: US 9,193,307 B2
(45) Date of Patent: *Nov. 24, 2015

(54) AUTOMOTIVE STORAGE CONTAINER

(71) Applicants: Robert Roach, Holt, MI (US); Craig Wieland, Mason, MI (US)

(72) Inventors: Robert Roach, Holt, MI (US); Craig Wieland, Mason, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/454,409

(22) Filed: Aug. 7, 2014

(65) Prior Publication Data

US 2014/0346205 A1  Nov. 27, 2014

Related U.S. Application Data

(63) Continuation-in-part of application No. 14/270,052, filed on May 5, 2014, which is a continuation-in-part of application No. 14/076,926, filed on Nov. 11, 2013, which is a continuation-in-part of application No. 13/447,163, filed on Apr. 13, 2012, now Pat. No. 8,701,950, which is a continuation-in-part of application No. 13/087,140, filed on Apr. 14, 2011, now abandoned.

(51) Int. Cl.
*B60R 9/06* (2006.01)
*B60P 7/08* (2006.01)

(52) U.S. Cl.
CPC ............... *B60R 9/065* (2013.01); *B60P 7/0892* (2013.01)

(58) Field of Classification Search
CPC ....................................................... B60R 9/065
USPC ......... 224/403, 404, 495, 497, 539, 542, 549; 220/6, 4.29, 4.27, 23.83, 23.88, 81, 220/1.5, 9.3, 9.2, 811–816; 312/258–262; 108/11, 14, 51.3, 157.14; 296/37.14, 296/37.6, 37.1; 16/362–364
See application file for complete search history.

(56) References Cited

U.S. PATENT DOCUMENTS

| 954,918 A | 4/1910 | Biro |
| 1,444,487 A | 2/1923 | Volters |
| 1,449,419 A | 3/1923 | Kraus |
| 1,489,527 A | 4/1924 | Henry |
| 2,529,983 A | 11/1950 | White |

(Continued)

OTHER PUBLICATIONS

The United States Patent and Trademark Office, "Notice of Allowance", issued in connection with U.S. Appl. No. 29/449,629, mailed on Sep. 12, 2014, 29 pages.

(Continued)

*Primary Examiner* — Justin Larson
*Assistant Examiner* — Phillip Schmidt
(74) *Attorney, Agent, or Firm* — Hanley, Flight and Zimmerman, LLC

(57) ABSTRACT

An example automobile storage container includes a plurality of panels including at least a top panel, front panel, back panel, and two side panels arranged with respect to the base panel. The plurality of panels interconnect to form an enclosed storage area when all of the plurality of panels are in a closed position. The back panel and two side panels are affixed with respect to the base panel. Each of the top and front panels is separately movable into both an open position and a closed position. The top panel is pivotable with respect to the back panel to move between the open position and the closed position. The front panel is movable to slide under the base of the container to arrange the front panel in the open position. The example container includes a control device is to grab and constrain movement of the front panel.

20 Claims, 17 Drawing Sheets

(56) References Cited

U.S. PATENT DOCUMENTS

| | | | |
|---|---|---|---|
| 3,995,764 A * | 12/1976 | Zagami | 220/263 |
| 4,230,227 A | 10/1980 | Kowall et al. | |
| 4,260,091 A | 4/1981 | French et al. | |
| D274,139 S | 6/1984 | Suffern et al. | |
| 4,673,087 A | 6/1987 | Webb | |
| 4,828,312 A | 5/1989 | Kinkel et al. | |
| 4,848,618 A * | 7/1989 | Yuan et al. | 220/1.5 |
| 4,875,730 A | 10/1989 | Justice | |
| 5,226,302 A | 7/1993 | Anderson | |
| 5,299,704 A | 4/1994 | Thorby | |
| 5,341,950 A * | 8/1994 | Sinz | 220/6 |
| 5,368,210 A | 11/1994 | Wotring | |
| 5,456,514 A | 10/1995 | Justice | |
| 5,782,372 A | 7/1998 | Weiss et al. | |
| 5,853,116 A | 12/1998 | Schreiner | |
| 5,862,932 A | 1/1999 | Walsh et al. | |
| 5,875,912 A | 3/1999 | Hobson | |
| 6,015,178 A | 1/2000 | Haack | |
| 6,070,775 A | 6/2000 | Tolley et al. | |
| D430,103 S | 8/2000 | Scudder | |
| 6,254,162 B1 * | 7/2001 | Faber et al. | 296/39.2 |
| 6,267,427 B1 | 7/2001 | Ziehl | |
| 6,308,873 B1 | 10/2001 | Baldas et al. | |
| 6,401,995 B1 * | 6/2002 | Yuille et al. | 224/404 |
| 6,454,148 B1 | 9/2002 | Cook | |
| 6,507,701 B2 | 1/2003 | Lake | |
| 6,536,826 B1 | 3/2003 | Reed | |
| 6,644,710 B2 | 11/2003 | Seel et al. | |
| 6,749,077 B1 * | 6/2004 | McAlpine et al. | 220/4.29 |
| 6,827,385 B2 | 12/2004 | Mobley | |
| 6,938,807 B2 | 9/2005 | Victor | |
| 6,986,541 B1 | 1/2006 | Haack | |
| 7,097,224 B2 | 8/2006 | Lester et al. | |
| 7,290,820 B1 | 11/2007 | Smith et al. | |
| D658,373 S | 5/2012 | Gros | |
| D659,632 S | 5/2012 | Jordan | |
| D660,781 S | 5/2012 | Ruffino et al. | |
| 8,215,693 B2 | 7/2012 | Ulita | |
| 8,701,950 B2 | 4/2014 | Roach et al. | |
| D722,009 S | 2/2015 | Roach et al. | |
| 8,960,756 B2 | 2/2015 | Roach et al. | |
| 2001/0017474 A1 | 8/2001 | Leitner et al. | |
| 2002/0175530 A1 | 11/2002 | Lake | |
| 2003/0085584 A1 | 5/2003 | Golden | |
| 2003/0098591 A1 | 5/2003 | Leitner et al. | |
| 2004/0232016 A1 | 11/2004 | Dietrich | |
| 2005/0242138 A1 | 11/2005 | Warganich | |
| 2006/0266778 A1 | 11/2006 | Allotey | |
| 2007/0119093 A1 | 5/2007 | Jaskulski | |
| 2008/0264946 A1 | 10/2008 | Moschella et al. | |
| 2009/0056592 A1 | 3/2009 | Threet et al. | |
| 2009/0189404 A1 | 7/2009 | Anderson et al. | |
| 2009/0255967 A1 | 10/2009 | Lueder | |
| 2009/0321434 A1 | 12/2009 | Rothschild et al. | |
| 2010/0252468 A1 * | 10/2010 | Pratte et al. | 206/363 |
| 2010/0264180 A1 | 10/2010 | Allotey | |
| 2010/0270821 A1 | 10/2010 | Ulita | |
| 2010/0320793 A1 | 12/2010 | Aebker et al. | |
| 2012/0181810 A1 | 7/2012 | Alvarino | |
| 2012/0261451 A1 | 10/2012 | Roach et al. | |
| 2012/0261452 A1 | 10/2012 | Roach et al. | |
| 2012/0261938 A1 | 10/2012 | Roach et al. | |
| 2014/0062042 A1 | 3/2014 | Wagner et al. | |
| 2014/0175137 A1 | 6/2014 | Roach et al. | |
| 2014/0326764 A1 | 11/2014 | Roach et al. | |

OTHER PUBLICATIONS

The United States Patent and Trademark Office, "Notice of Allowance", issued in connection with U.S. Appl. No. 13/446,447, mailed on Nov. 13, 2014, pp. 15.

United States Patent and Trademark Office, "Non-Final Office action" issued in connection with U.S. Appl. No. 13/447,163, mailed on Apr. 1, 2013, 17 Pages.

United States Patent and Trademark Office, "Final Office action" issued in connection with U.S. Appl. No. 13/447,163, mailed on Jul. 18, 2013, 21 Pages.

United States Patent and Trademark Office, "Advisory action" issued in connection with U.S. Appl. No. 13/447,163, mailed on Oct. 10, 2013, 3 Pages.

United States Patent and Trademark Office, "Non-Final Office action" issued in connection with U.S. Appl. No. 13/087,140, mailed on Dec. 28, 2012, 13 Pages.

United States Patent and Trademark Office, "Final Office action" issued in connection with U.S. Appl. No. 13/087,140, mailed on Apr. 25, 2013, 19 Pages.

United States Patent and Trademark Office, "Non-Final Office action" issued in connection with U.S. Appl. No. 13/446,447, mailed on Aug. 6, 2013, 12 Pages.

United States Patent and Trademark Office, "Non-Final Office action", issued in connection with U.S. Appl. No. 13/446,447, mailed on Mar. 18, 2014, 14 Pages.

United States Patent and Trademark Office, "Notice of Allowance", issued in connection with U.S. Appl. No. 13/447,163, mailed on Feb. 3, 2014, 58 Pages.

United States Patent and Trademark Office, "Final Office Action" issued in connection with U.S. Appl. No. 13/446,447, mailed on Jul. 9, 2014, 10 Pages.

United States Patent and Trademark Office, "Non-Final office action", issued in connection with U.S. Appl. No. 14/270,052, mailed on May 19, 2015, 55 pages.

United States Patent and Trademark Office, "Non-Final office action", issued in connection with U.S. Appl. No. 14/076,926, mailed on Mar. 12, 2015, 88 pages.

\* cited by examiner

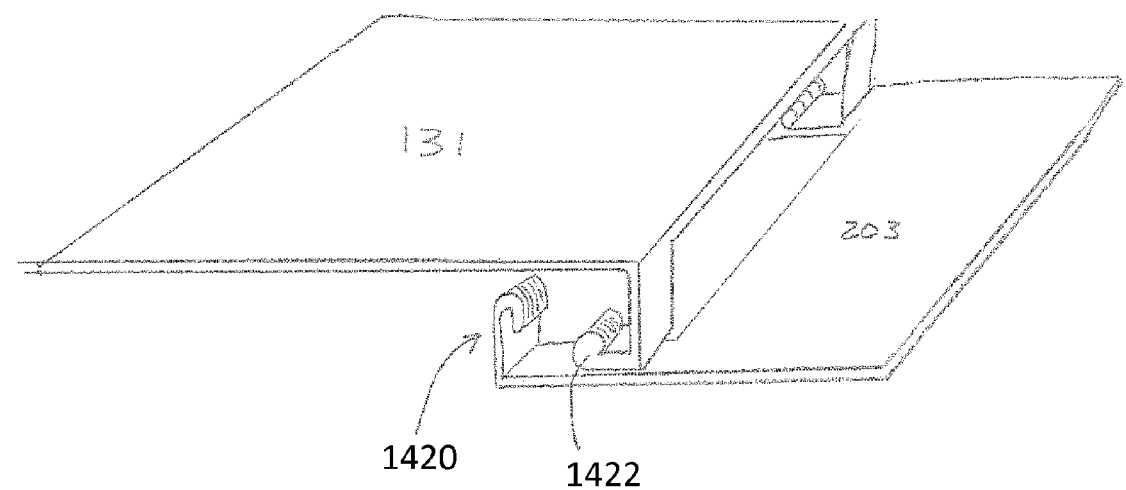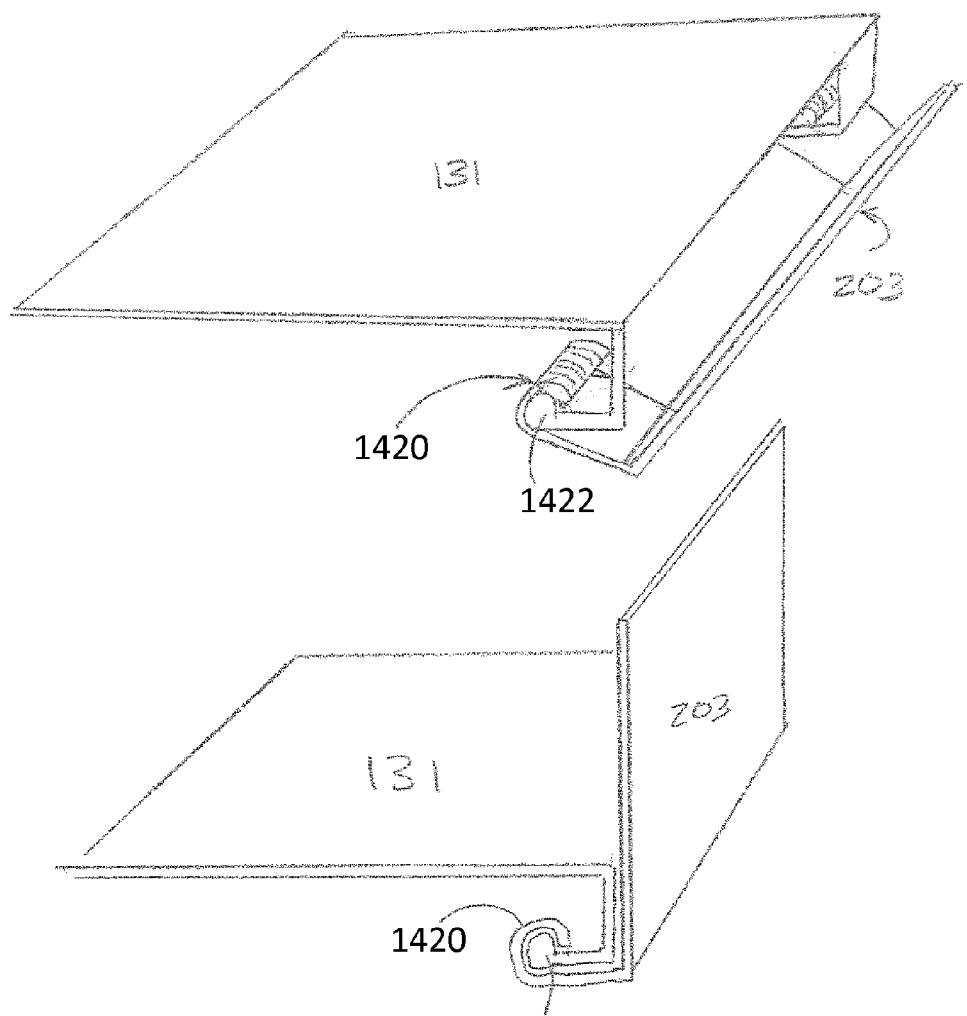
FIG 14

AUTOMOTIVE STORAGE CONTAINER

CROSS-REFERENCE TO RELATED APPLICATIONS

The present application claims the benefit of and priority to U.S. patent application Ser. No. 14/270,052, filed on May 5, 2014, for "Collapsible Automobile Storage Container", which claims the benefit of and priority to U.S. patent application Ser. No. 14/076,926, filed on Nov. 11, 2013, for "Collapsible Automobile Storage Container," which claims the benefit of and priority to U.S. patent application Ser. No. 13/447,163, filed on Apr. 13, 2012, for "Collapsible Automobile Storage Container," which claims the benefit of and priority to U.S. patent application Ser. No. 13/087,140, filed on Apr. 14, 2011, for "Collapsible Storage Container for a Bed of a Truck", each of which is incorporated herein by reference in its entirety for all purposes.

BACKGROUND

The present embodiments generally relate to storage containers for automobiles, such as pickup trucks, sports utility vehicles and the like.

Automobiles or vehicles are often used to carry personal and/or commercial cargo. A pickup truck (which may be referred to as a truck) is a motor vehicle or automobile with an open-top rear cargo area which is generally (but does not have to be) separated from a cabin to allow for chassis flex when carrying or pulling heavy loads. The open-top rear cargo area is generally referred to as the bed of the truck. The bed of the truck is generally configured to store, carry, or haul various items. However, because the bed of the truck has an open top (i.e., is not covered), the various items are generally exposed to the weather and/or the possibility of theft. Furthermore, because of the bed of the truck is generally sized to store, carry, or haul larger items (e.g., gravel and wood), smaller items (e.g., groceries or tools) may slide around the bed of the truck. For some items, such as gravel, wood, and landscaping items, being exposed to the possibility of weather, theft, and sliding around is generally not a problem. However, for other items, such as carpentry tools, groceries, and clothes, being exposed to the possibility of weather, theft, and sliding around is generally not acceptable. In some situations, the person using the truck may choose to place these items in the cabin of the truck to prevent exposure. Existing containers are inflexible and inadequate to accommodate access in a way that is convenient from the rear of the truck bed.

BRIEF DESCRIPTION OF THE DRAWINGS

Example embodiments are described herein with reference to the following drawings.

FIG. 14 illustrates an example storage container including a hook and ball guide for a front panel as the front panel relates to a base of the storage container.

Figure 1:
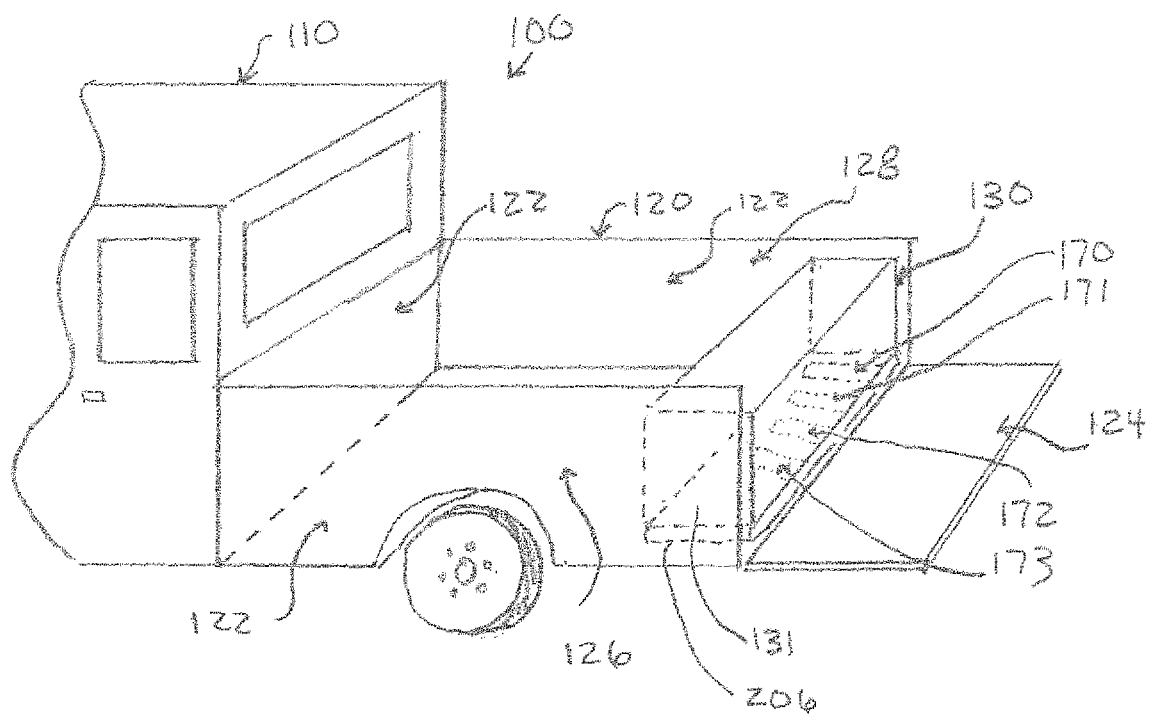
FIG. 1 illustrates an example of a storage container in a back of a vehicle such as a truck.

The following detailed description may be better understood when read in conjunction with the drawings which show certain example embodiments. The drawings are for the purpose of illustrating concepts, but it is understood that the inventions are not limited to the arrangements and instrumentality shown in the drawings.

DETAILED DESCRIPTION OF CERTAIN EMBODIMENTS

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and other changes may be made without departing from the scope of the subject matter of this disclosure. The following detailed description is, therefore, provided to describe an exemplary implementation and not to be taken as limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

BRIEF DESCRIPTION

The present embodiments relate to a storage container (SC) for an automobile, such as a truck, sport utility vehicle (SUV), all-terrain vehicle (ATV) (e.g., quad, quad bike, three wheeler, four wheeler, etc.), recreational vehicle (RV), and the like. Flat cargo trailers (e.g., for transport of snowmobiles, motorcycles, ATVs, etc.) can also utilize a storage container to store belongings while using the transported vehicle.

Certain examples provide a storage container that is integrated so that all four sides as well as top and bottom are attached to each other and do not need to be separately handled or stored. Thus, a person can choose to store items in the container in a truck bed, trailer bed, jeep storage space, etc., without fear of spillage, etc. Rather than forcing a user to access the storage container from only one of a top of the container or a front of the container, certain examples, allow access via top and front panels independently and/or simultaneously.

Certain examples provide an automobile storage container including a plurality of panels arranged with respect to a base. The plurality of panels includes at least a top panel, a front panel, a back panel, and two side panels. The front panel is movable to slide under the base of the container. The example container also includes a control device to grab and constrain the front panel in position to 1) swing vertically into an erected position against the side panels, top panel and base and to 2) keep the front panel from being pulled beyond a front edge of the base. The plurality of panels are interconnected to form an enclosed storage area when both the top is closed and the front panel is pulled out from under the base and is closed as well.

In certain examples, a storage container includes a plurality of panels including at least a top panel, front panel, back panel, and two side panels arranged with respect to the base panel. The plurality of panels interconnect to form an enclosed storage area when all of the plurality of panels are in a closed position. The back panel and two side panels are affixed with respect to the base panel. Each of the top and front panels is separately movable into both an open position and a closed position. The top panel is pivotable with respect to the back panel to move between the open position and the closed position. The front panel is movable to slide under the base of the container to arrange the front panel in the open position. The container further includes a control device to grab and constrain the front panel in position to 1) swing vertically into an erected position against the side panels and base panel and to 2) keep the front panel from being pulled beyond a front edge of the base panel.

In certain examples, the container further includes a bottom below the base panel of the container, the base connected to the bottom to form a cavity between the base panel and the bottom, the cavity accommodating the front panel when the front panel is moved under the base panel. In certain examples, the control device is arranged to keep the front panel from inadvertently being pulled out of the cavity created between the base panel and the bottom of the container. The front panel can span an entire opening from side to side of the cavity created by the bottom and base panel of the container. In certain examples, the bottom can be attached to the base panel as a separate piece or the bed of the truck can serve as the bottom of the storage container.

In certain examples, the plurality of panels include at least one of plastic panels and metal panels. In certain examples, the automobile includes at least one of a truck, an all-terrain vehicle, a recreational vehicle, or a trailer. In certain examples, the container is incorporated into a liner for the automobile. In certain examples the container is configured for arrangement either horizontally or vertically in a bed of the automobile.

In certain examples, the container includes at least one of tapered latch hooks or rubber hooks connecting the top and front panels of the container. In certain examples, the top and front panels include tongue and groove configurations connecting the panels of the container.

In certain examples, the control device includes a pair of cam-shaped discs attached to a bottom of the front panel to guide movement and position of the front panel with respect to the base panel of the container. The cam-shaped discs can include at least one of circle cam discs, square cam discs, or trapezoidal cam discs.

In certain examples, the control device comprises a pin and groove alignment of the front panel and the base panel. In certain examples, the control device includes a hook and ball connecting and guiding the front panel with respect to the base panel. In certain examples, the control device includes a block and hinge connecting and guiding the front panel with respect to the base panel.

In certain examples, the top panel is attached to the back panel such that the top panel is openable with respect to the back panel, top panel and side panels.

In certain examples, the front panel includes a lock to secure the container when the panels are in the closed position. In certain examples, the top panel is movable to be opened or closed with respect to the back and side panels when the front panel is locked in the closed position. In certain examples, the front panel is movable when the top panel is in the open position and when the top panel is in the closed position, and the top panel is movable when the front panel is in the open position and when the front panel is in the closed position.

Reference herein to "embodiment" means that a feature, structure, or characteristic described in connection with the embodiment can be included in at least one embodiment. The appearance of this phrase in various places in the specification is not necessarily all referring to the same or single embodiment or even different and mutually exclusive embodiments. Separate or alternative embodiments are not mutually exclusive embodiments. Instead, the embodiments described herein, explicitly and implicitly understood by one skilled in the art, may be combined with other embodiments. The embodiments and combinations thereof are all within the scope of this patent document.

It is also worth noting that unless stated otherwise the various embodiments disclosed herein are not limited in their application to the details of design and arrangement of the components set forth in the previous and following description or as illustrated in the drawings. Instead, the previous description, following description, and the drawings focus on presenting concepts of various embodiments. The embodiments described herein may stand alone or be combined with each other.

One or more of the embodiments may be implemented as a method, system, article of manufacture, apparatus, or device. It should be noted that the methods, systems, articles of manufacture, apparatus, and devices provided herein are merely illustrative and should not be considered as limiting. Accordingly, while the following describes example methods, systems, articles of manufacture, and apparatus, the examples provided are not the only way to implement such methods, systems, articles of manufacture, and apparatus.

DETAILED DESCRIPTION

FIG. 1A illustrates a truck 100. The truck 100 is described and disclosed herein for purposes of example illustration only. Other vehicles, such as trailers, flatbed trucks, SUVs, ATVs, RVs, etc., can be substituted for the truck 100 in the example of FIG. 1A. The truck 100 includes a cabin 110 and a bed 120. The bed 120 is generally (but does not have to be) separated from (e.g., independent of) the cabin 110 to allow for chassis flex when carrying or pulling heavy loads. The cabin 110 is coupled with the bed 120. As used herein, the term "coupled with" may include a direct connection or indirect connection via one or more intermediary components. For example, the cabin 110 may be welded directly to the bed 120 or connected via a motor-vehicle chassis. The truck 100 may include additional, different, or fewer components.

The truck 100 shown in FIG. 1A is a pickup truck. As will be discussed in more detail below, a pickup truck includes side walls along the edge of the bed 120. However, in some embodiments, a storage container in accordance with an embodiment may be installed in or used with a vehicle that is pulling a trailer or even a semi-truck. For example, a storage container may be installed on a trailer that does not include as many (e.g., relative to a pickup) or any side walls along the edges of the floor of the trailer. In another example, a storage container may be installed in a semi-truck (e.g., near the rear doors, in a vertical plane on the back wall of the cabin, etc.). In another example, a storage container may be installed in a vertical plane along a back wall and/or side wall of an RV or the like.

The cabin 110 is an enclosed space where at least the driver is seated when driving the truck 100. The cabin 110 may be referred to as a "cab." The cabin 110 may be any now known or later developed cabin of a truck. For example, the cabin 110 may be a standard cabin, extended (or super) cabin, or crew cabin. A standard cabin has a single row of seats and a single set of doors, one on each side. Most pickups have a front bench seat that can be used by two or more people; however, various manufacturers have begun to offer individual seats with a console in the middle of the seats. An extended cabin includes additional space behind the main seating area. This additional space may be accessed by reclining the front bench forward or a rear access door on one or both sides of the cabin 110. A rear access door may be a door hinged on the trailing edge, which is the edge closer to the rear of the truck 100. One or more seats may be placed in the area behind the front bench. For example, in an embodiment, the cabin 110 may include a side-facing seat that can fold into the walls behind the front bench. However, in other embodiments, a full bench may be placed in the back. A crew cabin may be a cabin with four-doors. A crew cabin includes seating for up to five or six people on two full benches and full-size front-hinged doors on both sides. Most crew cab pickups have a shorter bed or box to reduce their overall length.

The bed 120 includes one or more side walls 122, a tailgate 124, and a floor 126. The side walls 122, tailgate 124, and floor 126 are configured to form an open-top cargo area 128. The open-top cargo area 128 may be used for carrying or hauling cargo, such as tools, gravel, groceries, clothes, or other items. Because the bed 120 is an open-top cargo area 128, the various items being carried or hauled are exposed to the weather and the possibility of theft. For some items, such as gravel and wood, weather and/or theft are generally not a problem. However, for other items, such as carpentry tools, groceries, and clothes, being exposed to the weather and theft are generally a concern.

In an embodiment, the bed 120 includes a storage container 130. As shown in FIG. 1, the bed 120 includes a storage container 130. In the closed position, the storage container 130 may be enclosed and configured to store, haul, or carry cargo. In other words, the storage container 130 may be closed off on all sides if the top is down and the front panel is pulled out from under the base and is closed tight against the sides and back. The inside or interior of the storage container 130 may be used as a cargo container to prevent cargo from sliding, being exposed to weather, and/or being stolen.

In some embodiments, although one or more of the side walls of the storage container 130 may abut the bed 120 of the truck 100, the inside or interior of the storage container 130 (e.g., the area that stores, hauls, or carries cargo) is disposed in the open-top cargo area 128. For example, the inside or interior of the storage container 130 may be disposed between the side walls 122 and the tailgate 124, as well as being above the floor 126. For example, the storage container 130 is not a container inside of a compartment built in a side wall 122. Instead, the inside or interior of the storage container 130 may be disposed in the open-top cargo area 128. The storage container 130 is generally smaller than the bed 120 of the truck 100. For example, the bottom of the storage container 130, may be less than half of the square footage of the bed 120 of the truck. In some embodiments, the bottom of the storage container 130, may be less than a quarter of the square footage of the bed 120 of the truck. In some embodiments, the storage container 130 may be the same size or almost the same size as the bed 120 of the truck 100. The term "almost" accounts for the physical structure of the storage container 130.

In certain embodiments, the gap between the base panel 131 and bottom panel 206 of the container 130 can include one or more trusses 170, 171, 172, and/or 173 or other sliding supports attached to a bottom edge of the front panel 203 such that when the front panel is pulled out from under the base 131, the trusses 170, 171, 172, and/or 173 provide support. That is, back, side and front panels may not have an ability to provide support to the base so the trusses 170, 171, 172, and/or 173 provide this support for them. In other embodiments, due to the configuration and/or material of the panels, one or more trusses 170-173 may not be included in the design.

For example, in a truss-based embodiment, a front panel of the container 130 is housed beneath a base of the container 130 (but perhaps protected by a bottom sheet or panel underneath). By sliding the panel underneath the base, the container 130 can be placed and effectively used in a variety of positions in a vehicle bed, including at the edge of a truck or trailer tailgate. If the front panel of the container 130 is pulled out and "flipped up" or in the fully closed position, then the front panel is no longer able to provide support to the floor or base of the container 130. One or more trusses 170, 171, 172, and/or 173 or movable supports are installed on the bottom of the front panel/door edge via hinges, allowing the trusses 170, 171, 172, and/or 173 to be pulled forward and provide support when the front panel cannot provide support due to its position. The example of FIG. 1 shows the trusses extending along a width of the container 130. The number of trusses and/or other support(s) 170-173 may vary (e.g., a single truss, two trusses, three trusses, four trusses, five trusses, etc.). Trusses may be located to move along a direction of panel movement (e.g., a front panel slides underneath a floor or base panel of the container 130), normal to a direction of panel movement, diagonal to a direction of panel movement, etc. In a non-truss based embodiment, one or more of a circle cam disc, pin and groove, hook and ball, block and hinge, etc., can be implemented to maintain support and front panel position without use of truss(es).

In certain examples the width of the base in which the trusses and front panel reside when the front panel is slid under the base is approximately the same length of the sum of the height of the front panel and the length of the trusses.

The storage container 130 is generally located near the tailgate 124. This location may allow a user to reach the storage container 130 without climbing into the bed 120 of the truck 100. However, the location of the storage container 130 is not limited, for example, as long as it is disposed in the bed 120. For example, the storage container 130 may be disposed near the cab 110, as opposed to near the tailgate 124. In this example, a user may reach over a side wall 122 of the bed 120 or climb into the bed 120 to access the storage container 130. Other locations and ways of accessing the storage container 130 are included within the scope of this description.

For example, the storage container 130 may be oriented in a variety of ways in a truck bed or other vehicle platform. While many of the figures show the container 130 oriented with ends facing a side wall of a truck bed, the container 130 may be positioned such that the ends face the cab and tailgate of the truck. Other orientation or positioning is envisioned as well.

The storage container 130 may be made of one or more materials. For example, the storage container 130 may be made of plastic, metal (e.g., ferrous or non-ferrous, insulated or non-insulated, etc., such as aluminum, steel, etc.), wood, or other material. The material may be weatherproof. For example, stainless steel or plastic may be used to protect against rain and snow. The material may also prevent or at least deter theft. For example, a hard plastic, such as TEFLON®, may be used to protect against both the weather and theft.

For example, the storage container 130 may be designed to fit in the back of a truck bed or other vehicle back/space. The sides and top and/or other panels/walls of the example storage container 130 can be made of a material such as an insulated High Density Polyethylene, Acrylonitrile Butadiene Styrene (ABS) plastic, polypropylene, etc., and hinges, locks, and brackets can be made from stainless steel, aluminum, etc. The example storage container 130 is engineered to be weather resistant and lockable and also secures cargo from rolling around in the bed of the truck or other vehicle/trailer. The example container 130 is fastened to the truck bed with four stainless steel bolts securing the unit to the vehicle. In other examples, the container 130 may be held in place by the weight of the container 130 and friction between the container 130 bottom and the truck/vehicle bed. The container 130 may be built into a vehicle, sold as an accessory by an automotive dealer or manufacturer (e.g., as a bedliner, storage box, etc.), sold as an "after-market" item (e.g., a bedliner, storage box, etc.), etc.

Figure 3:
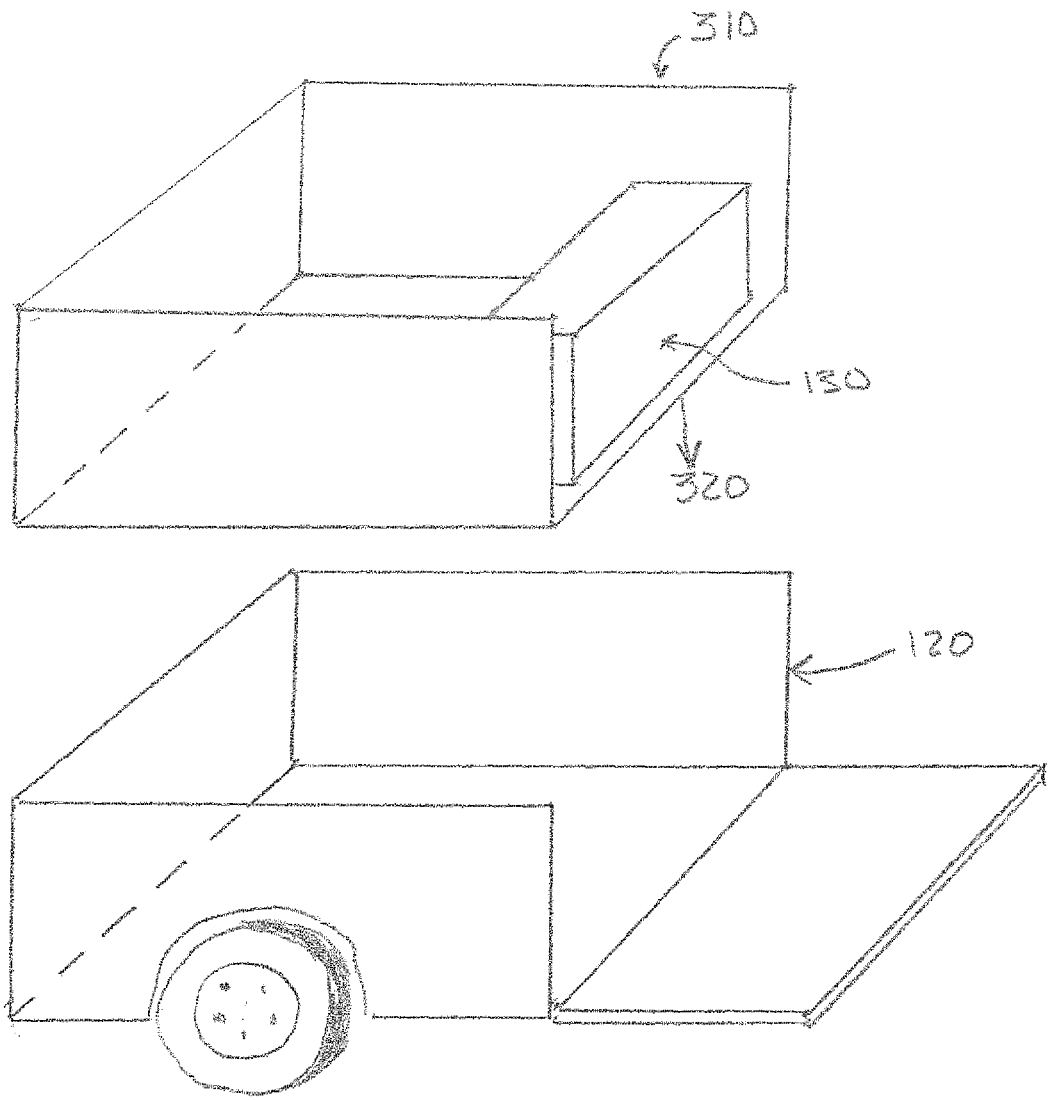
FIG. 3 illustrates an example of a storage container which has been installed in a bed liner, and the bedliner is installed into a truck bed.

In certain examples, as shown in FIG. 3, the container 130 is provided as a part of and/or can be connected to a bedliner. For example, in an embodiment, a bedliner is configured to receive a storage container 130 for a bed of a truck and/or other vehicle, trailer, etc. A bedliner is a liner that covers a bed of a truck. The bedliner may protect a truck bed from damage and can prevent fine-grained cargo from moving around in the bed of the truck. The storage container 130 may protect items placed in the interior of the storage container from the possibility of weather, theft, and sliding around the bed of the truck.

In an embodiment, a bedliner is configured to cover at least a floor of a bed of a truck and/or other vehicle and receive a storage container. The container may include a connection device that is configured to connect the storage container to the bedliner of a bed of a truck and/or other vehicle. The storage container includes an enclosed area, which is accessible, when the either the top panel is open, the front panel is open or both.

Figure 3A:
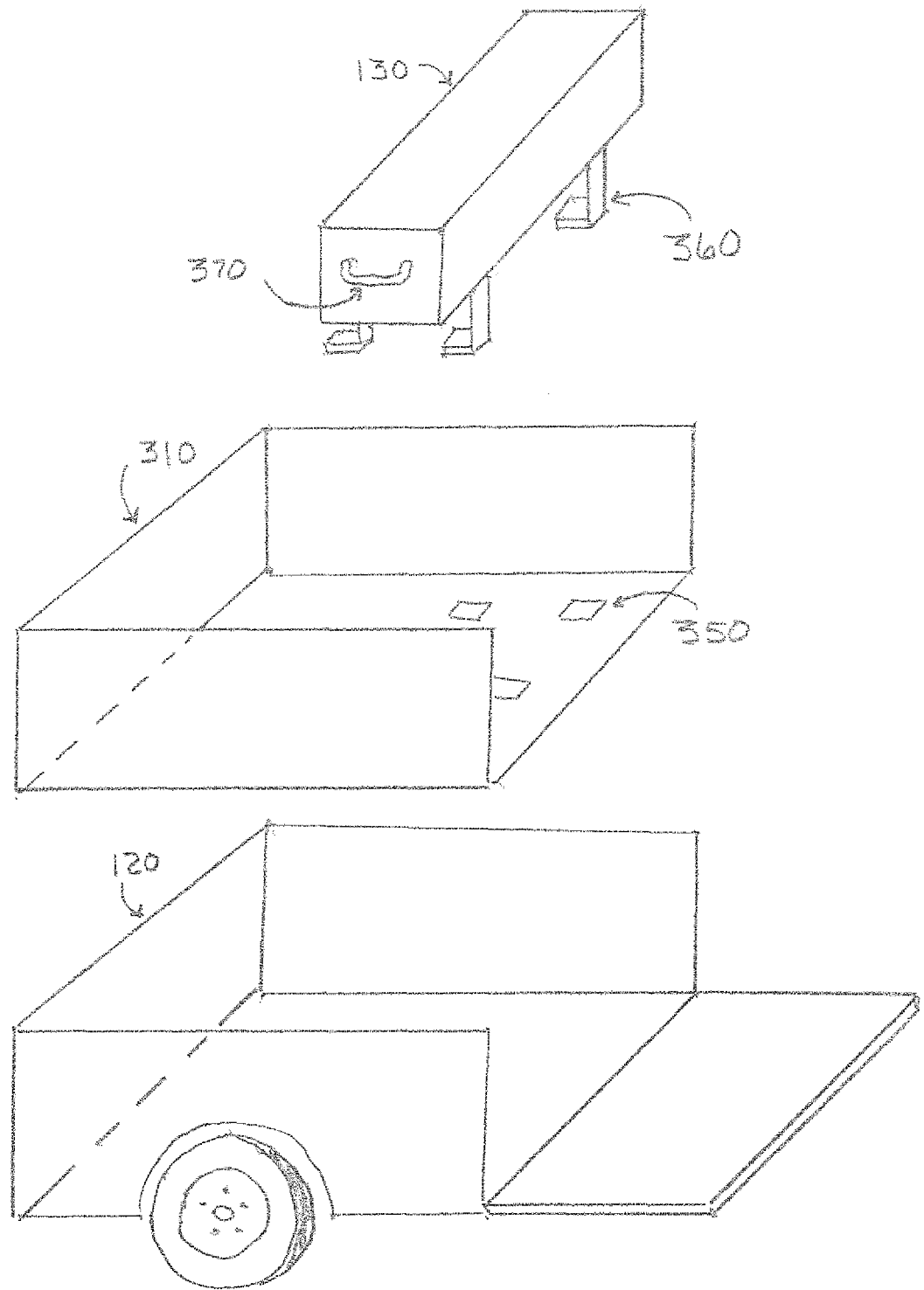
FIG. 3A illustrates an example of a storage container which can be installed in a bed liner using slots and then this same bed liner can be installed into a truck bed.

In another embodiment, as shown in FIG. 3A, a bedliner for a bed of a truck and/or other vehicle includes a floor covering, one or more side coverings, and a reception device. The floor covering is sized fit on a floor of a bed of a truck/vehicle. The one or more side coverings are sized to fit on one or more side walls of the bed of the truck/vehicle. The floor covering is coupled with the one or more side coverings such that the floor covering and one or more side covering cover the bed of the truck. The reception device is configured to receive a storage container.

In yet another embodiment, a method of manufacturing a bedliner includes forming a floor covering that is sized fit on a floor of a bed of a truck; forming one or more side coverings that are sized to fit on one or more side walls of the bed of the truck, wherein the floor covering is coupled with the one or more side coverings such that the floor covering and one or more side covering cover the bed of the truck; and forming a reception device that is configured to receive a storage container.

The storage container 130 may include a security system (e.g., a lock, sensor, etc.). The security system may include an alarm system that alarms a user or others near the storage container 130 when the interior of storage container 130 is being accessed without authorization. For example, the storage container 130 may include an audio alarm that sounds an alarm if the storage container 130 is opened without disabling or disarming the alarm. The audio alarm may alert others in the nearby area that the storage container 130 is being opened. The alarm system may include a key pad or wireless remote system that allows the user to disarm the alarm system and access the storage container 130 without the alarm being triggered.

Figure 4:
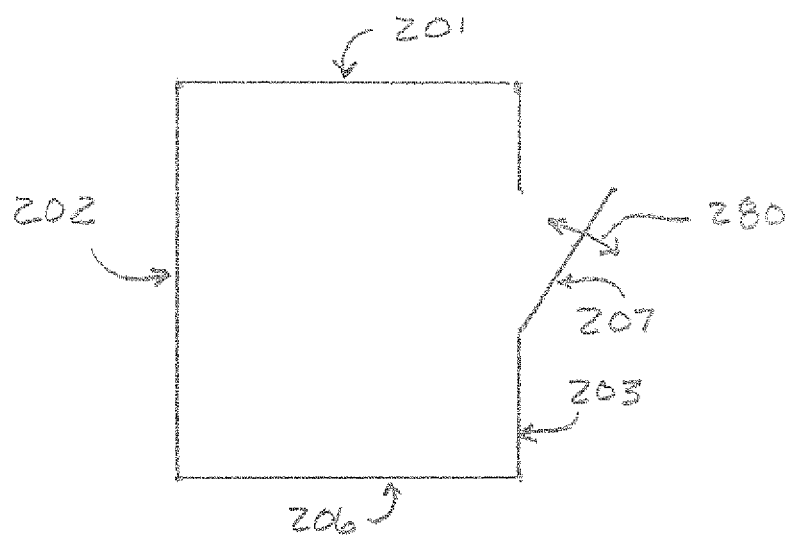
FIG. 4 illustrates an example storage container with an access panel provided in a front panel.

As shown in FIG. 4, one or more of the side walls of the storage container 130 may be configured to provide access to the inside or interior of the storage container 130. In other another embodiment, an access door may be provided to the inside of the storage container 130. When something large is to be retrieved from or placed in the inside of the storage container, either the top can be opened or the front panel can be opened or both can be open. However, a door or window may also be provided to allow the user to retrieve or place something small on the inside of the storage container. When access is not needed, the top, front panel and access door can be in the closed position.

The storage container 130 provides a storage container that may be used to store, carry and haul cargo. The storage container 130 may be weatherproof and/or secure from theft, such that the cargo inside the storage container 130 is protected from the weather and theft. Weatherproof may include protection against rain, snow, wind, or other weather. Secure from theft may include protection against theft. For example, the storage container 130 may deter or slow down a theft (e.g., relative to not having a storage container 130).

The storage container 130 may include one or more handles that are used for assisting with lifting the storage container into and out of the truck bed.

The storage container 130 may include one or more compartments or sections. The interior of the storage container 130 may include a compartment system that allows a user to compartmentalize the inside or interior of the storage container 130. For example, the inside or interior may include two compartments. One compartment may be a smaller compartment that is used to carry items that are likely to move around, such as groceries. Another compartment may be larger (e.g., relative to the smaller compartment) and used to carry larger items, such as tools, computers, etc.

The storage container 130 may include one or more dividers made of plastic or some other rigid material to be installed into the base of the container 130. For example, one or more dividers may be integrated as part of the container that can be "flipped up" to a position perpendicular to the base of the container 130. The flip-up divider(s) may help prevent items in the container 130 from rolling from side to side as easily as the items might if the dividers were not employed. When the divider(s) are not desired, they are "flipped down" and lie virtually flush with the top of the base, for example.

The storage container 130 may include a non-skid bottom, non-ski pad(s), etc. For example, the bottom of the container 130 (e.g., either a bottom that is integrated with a base panel as part of the container 130 or a bottom that is part of an installed bed liner, etc.) may be made up of a "non-skid"-type surface. The bottom may be made to be non-skid through material used in the manufacture of the bottom portion itself or by applying a material after manufacture of the bottom to make the bottom skid resistant, for example.

Thus, the container 130 can utilize an attachment system that is non-invasive. That is, a weight of the container 130 itself is sufficient to hold the container 130 in position in the vehicle without having to attach the container 130 to the vehicle by screws, latches, ties, etc. In certain examples, an additional ballast on the bottom 206 of the container 130 can help to secure a position of the container 130.

The storage container 130 may include one or more attachments or accessories. For example, the storage container 130 may include a cargo light. The cargo light can be installed on or in one or more sides of the container 130 (e.g., top, back, and/or two sides of the storage container 130). The cargo light may be an incandescent light, light emitting diode (LED), or the like, and can be powered by a battery situated next to the light, directly from an existing vehicle battery, etc.

The storage container 130 may include a drain plug or stopper to allow the container 130 to retain and release fluid. For example, a drain plug or other closable opening may be installed in a bottom of the container 130 and/or bedliner. For example, if water (e.g., from rain, melting ice, etc.) or other liquid has collected in the container 130, the plug may be opened to allow the liquid to drain from the container 130.

As shown in FIG. 3A, the storage container 130 may include handles 370. For example, one or more handles 370 or other grips may be positioned on or in the outside of the container such that once the container 130 is "un-hooked" or otherwise detached (e.g., from a truck bed or other vehicle, a base or receptacle on a truck bed or other vehicle, bedliner, etc.), the container 130 can be lifted and repositioned.

The storage container 130 may be insulated. For example, the walls of the container 130 may be constructed from an insulating material. Alternatively or in addition, insulation may be installed in the side(s), front, top, and/or back panels. For example, one or more panels may be insulated with material to delay effects of heat and/or cold transfer from inside the container 130 to outside and/or outside the container 130 to the inside.

The storage container 130 may include removable straps or netting inside the container 130. For example, straps, netting, and/or other support may be attached to one or more panels of the container 130 (e.g., attached to either of the two sides, top, back or front) such that it spans between two opposing panels to hold stationary items that may otherwise roll or shift in the container 130. The straps, netting, etc., may be removable such that they are installed at times and uninstalled and stored at other times.

The storage container 130 may include one or more indentations in a panel (e.g., a top or front panel, etc.) whereby a beverage container, such as a cup, bottle, can, etc., can be placed in an indentation. A beverage container placed in an indentation may be prevented from moving on the top of the container 130, for example, as easily as the beverage might without the recess.

Figure 5:
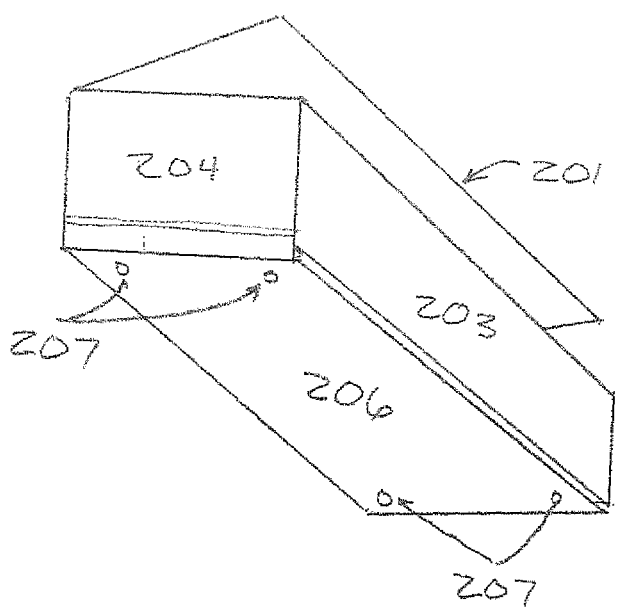
FIG. 5 illustrates a bottom view of an example storage container.
Figure 5A:
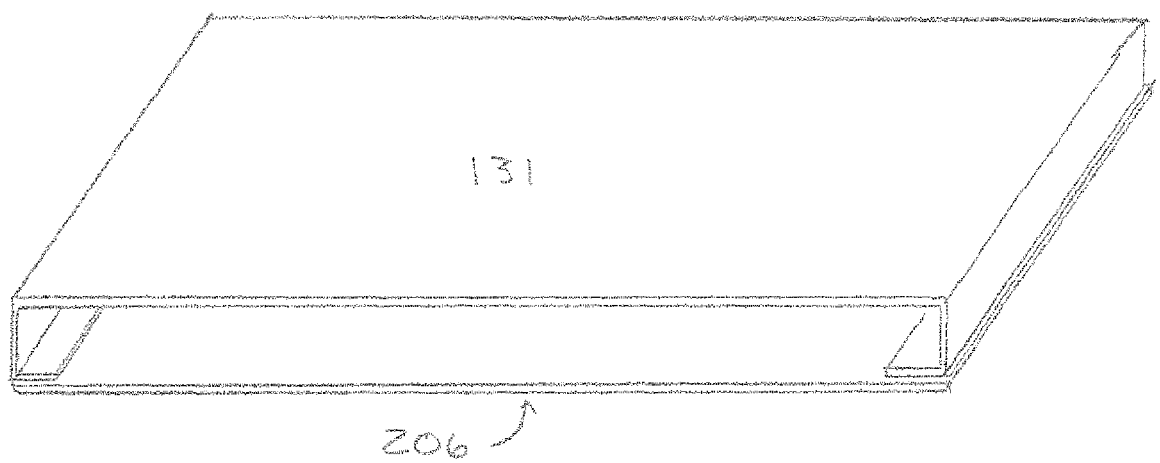
FIG. 5A illustrates an isolation drawing of just a base of the storage container of FIG. 5 in which the base is attached to a bottom of the example storage container to form a cavity into which a front panel of the storage container can slide.

The storage container 130 includes an attachment system 207 FIG. 5. The attachment system 207 may be used to connect or attach the storage container 130 to the bed 120 of the truck 100. The attachment system 207 may include holes in the bottom 206 where the storage container 130 can be screwed into the bed of the pickup, or other mechanisms for securing or fixing the storage container 130 to the bed 120 of the truck 100.

Figure 2:
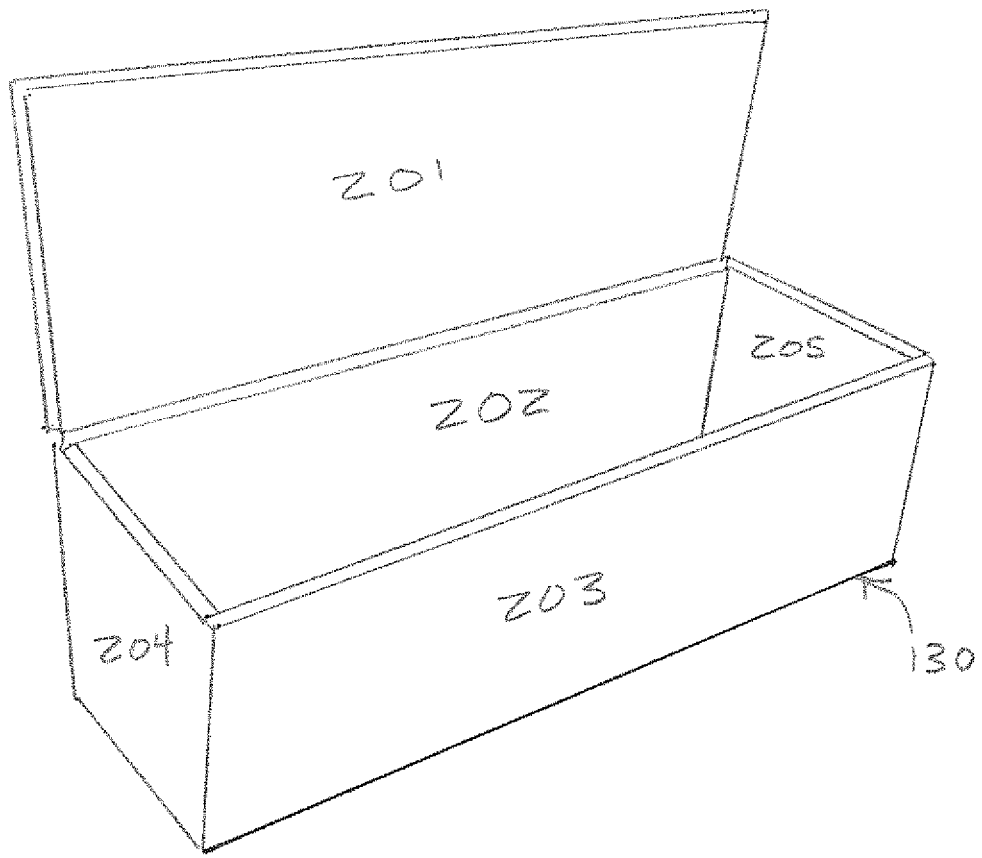
FIG. 2 illustrates an example of a storage container with a top open but a front panel closed.

For example, as shown in FIG. 2, in all embodiments, the side walls 204, 205 and the back panel 202 of the storage container 130 are able to support themselves. The side walls of the storage container 130 are rigid and able to remain in a fixed position if the top is open or the front is open, or if either is open. In an embodiment, a hook or latch system may be used to latch the front and top panels of the storage container 130. Hooks may be tapered and/or untapered latch hooks, for example. For example, two hooks may be located on the inside of each side panel that are tapered from a "pointed end" to a thicker or more robust middle and base. As a latch is turned or pushed into the receiving hole, the taper forces a tighter and tighter fit between the two panels. The tighter fit allows the container 130 to be weather tight when the latches are fully turned or pushed, for example.

In an embodiment, side panels may include tongue and groove sides. For example, side panels may include a tongue molded into an edge that lodges into a groove of a corresponding top or front panel when the container 130 is fully closed. Using this design, potential incoming moisture is forced through a tortuous path up, over and around this tongue prior to being able to enter the cavity created by the fully closed storage container. The tongue may be constructed from a solid material, a flexible and/or crushable material (such as a semi-hard plastic or rubber), etc.

As shown in the examples of FIG. 1, one or more supports (e.g., truss(es), etc.) 170-173 can be provided underneath the base 131 of the container 130 to provide support for the container 130 as the front panel 203 is pulled out from under the base 131. When the front panel is pulled out from underneath the base, the trusses 170, 171, 172, and/or 173 provide support. That is, the front panel will not have an ability to provide support to the base when it is pulled out from underneath the base (so that it can close up the storage container by nesting against the top and side panels), so the trusses 170, 171, 172, and/or 173 provide/replace this support.

For example, in an embodiment, a front panel of the container 130 is housed beneath a base of the container 130 (but perhaps protected by a bottom sheet or panel underneath). In certain examples, the trusses 170, 171, 172, and/or 173 extend underneath the base in the direction of movement as the panel is moved and provide/replace this support that had been provided by the panel when slid or otherwise positioned underneath the base. By sliding the panel underneath the base, the container 130 can be placed and effectively used in a variety of positions in a vehicle bed, including at the edge of a truck or trailer tailgate.

In an embodiment, if the front panel 203 of the container 130 is pulled out and "flipped up" or in the fully closed position, then support that the front door provided to the base 131 of the container is no longer provided. One or more trusses 170, 171, 172, and/or 173 or movable supports are installed on the bottom of the front panel edge via hinges, allowing the trusses 170, 171, 172, and/or 173 to be pulled forward and provide support when the front panel cannot due to its position. Thus, the base 131 can be supported by one or more trusses 170-173.

In a non-truss-based embodiment, one or more of a circle cam disc, pin and groove, hook and ball, block and hinge, etc., can be implemented to maintain front panel position without use of truss(es). For example, front panel 203 can slide between the base 131 and bottom panel 206. A stopping mechanism, such as a circle cam disc, pin and groove, hook and ball, block and hinge, etc., stops the moving front panel 203 from moving beyond (e.g., coming free from) its connection with the base 131 and allows the front panel 203 to move smoothly between an closed position perpendicular to the base 131 and an open position underneath the base 131.

The storage container 130 may include a plurality of locks 701, 702. The locks may be a locking system (e.g., including one or more locks) that secures the storage container 130 when the top is closed and the front panel is pulled out from under the base and nested against the side and top panels. The lock(s) may prevent one or both of the panels from moving and providing access to the interior of the storage container 130. In some embodiments, the locks 701, 702 may include a lock and key system on an edge of a front or top panel. A user may insert a key into the locking mechanism to lock the storage container 130.

In certain examples, an attachment system may be an invasive or non-invasive attachment system. An invasive attachment system is an attachment system that enters into the bed of the truck (e.g., is screwed into the bed of the truck). However, a non-invasive attachment system is an attachment system that attaches to the bed of the truck without entry into the truck.

Bed-Liner Storage Container Examples

In certain examples, a storage container may be connected to and/or incorporated in a bed liner. A truck bed liner is a covering that may protect a truck bed from damage and can prevent fine-grained cargo from moving around in the bed of the truck. A bed liner may be a drop-in bed liner. A bed liner is installed in the bed of the truck, for example, by snapping, screwing, or otherwise connecting the bed liner to the bed of the truck. A bed liner may be made of, for example, plastic, rubber, or other material. A bed liner may be made in a single piece (e.g., that is fitted to the bottom and sides of the bed of the truck) or separate pieces (e.g., that are installed individually on the bottom and sides of the bed of the truck). In some embodiments, a bed liner may be removable.

In some embodiments, as shown in FIG. 3, a storage container 130 is embedded in a bed liner 310. Embedded may include manufactured with (e.g., as a single piece), integrated with, built into, or otherwise formed with the bed liner 310. For example, during manufacture of a bed liner, the base panel 131 may be manufactured into the bed liner to allow for the use of a storage container when the bed liner is installed in the bed of a truck. The base panel 131, when manufactured as a single piece with the bed liner, may not be removed from the bed liner. For example, during manufacture, a single molding process may be used to form both the bed liner and the base 131 of the storage container. FIG. 3 illustrates a storage container 130 embedded in a bed liner 310 that has not been installed in the bed of the truck. The arrow 320 illustrates that the bed liner 310 may be installed in the bed 120 of the truck.

FIG. 3A illustrates another example of a bedliner 310. The bedliner 310 may be manufactured to receive a storage container 130. For example, when manufactured, the bedliner 310 may be formed to include reception slots 350. The reception slots 350 may be sized and configured to receive one or more connection devices 360 on the storage container 130. For example, prior to or after the bedliner 310 is connected to the bed 120 of the truck, one or more connection devices 360 may be inserted into the reception slots 350. When inserted, the one or more connection devices 360 may lock into the reception slots. This may lock the storage container 130 into place and prevent the storage container 130 from moving around.

Depending on where the connection devices 360 are located on the storage container 130, the reception slots may be located in other places of the bedliner 310. For example, the reception slots may be located on the side walls of the bedliner 310.

In an embodiment, a storage container is attached to a bedliner, such as the bedliner 310, which is shaped to cover the bottom of the bed of a pickup truck. In an embodiment, the bedliner 310 matches the shape of the bottom of the truck bed including sides. In an embodiment, the bedliner 310 matches the shape of the bottom of the truck bed without sides.

Accessing the Interior of an Example Storage Container

In an embodiment, instead of or as alternative to the top or front panel opening to provide access to the inside of the storage container 130, one or more of the sides may include a door or access panel that provide access to the inside. For example, a door or access panel 207, which is smaller than the front panel 203 of the storage container may be opened and closed to provide and prevent access to the inside of the storage container 130. One embodiment of this alternative is shown in FIG. 4 with the directional arrows indicating the movement of the access panel 207.

Additional Configuration Examples

Figure 8:
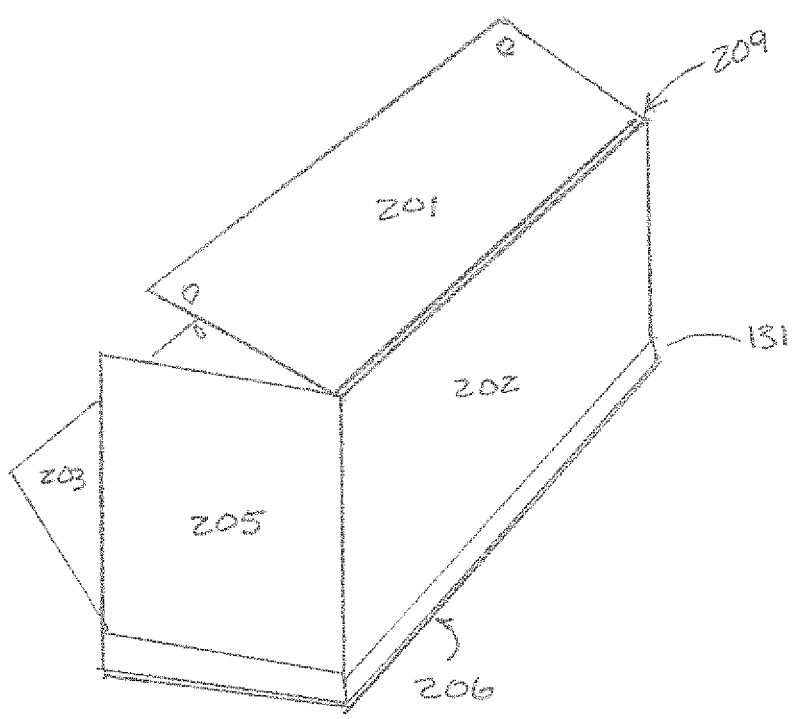
FIG. 8 illustrates an example storage container including the location of the hinge between the top and back panels.

FIG. 8 illustrates an example metal-based storage container 130. For example, the storage container 130 can be constructed from aluminum and/or other metal and/or alloy-based material usable to provide support and durability to the storage container 130. FIG. 8 illustrates the example storage container 130 in a transitional position of the front panel going between the open position where it was stored underneath the base 131 to the closed position where it will nest tightly against the top and side panels. As will be discussed further below, one or more of a circle cam disc, hook and ball, block and hinge, pin and groove, etc., can be implemented to maintain alignment, guidance, and connectivity between the front panel and the base 131 and bottom 206.

Figure 7:
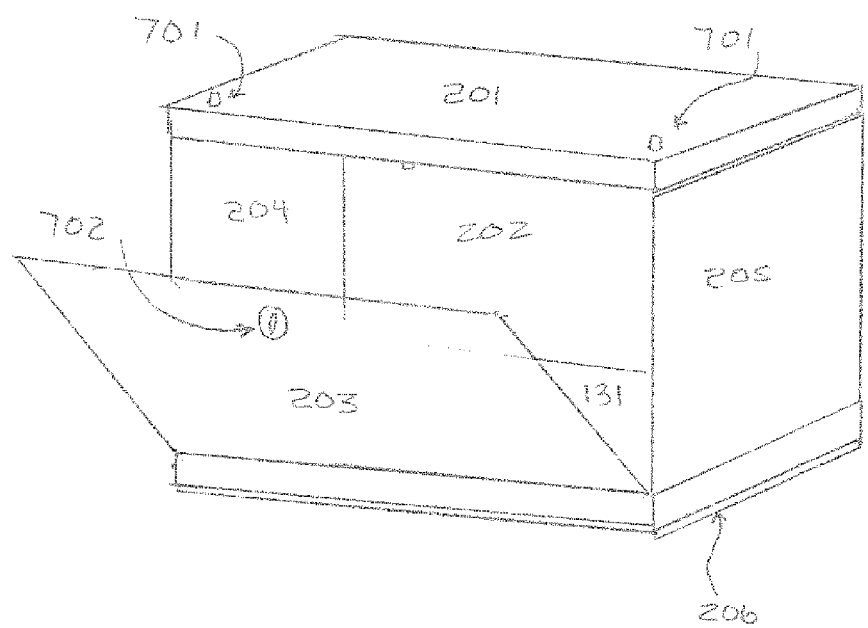
FIG. 7 illustrates an example storage container including lock locations.

As illustrated in FIG. 7, side panels 204, 205 are affixed to base panel 131. The side panels 204, 205 are fixed in an upright position. In the upright position, each side panel 204, 205 can be connected to the front panel 203 and the top panel 201. A top panel 2010 is permanently affixed to the back panel 202 via a hingeable or other pivotable connection 209 and is movable to enclose the interior of the container 130 in conjunction with the other panels 204, 205, 203, 201, 131.

In certain examples, a bottom 206 is located under the base panel 131 and forms a gap or cavity as shown in FIG. 5. The front panel 203 can slide into the cavity by moving under the base panel 131 and over the bottom panel. Thus, the container 130 can be installed in the bed of a truck or trailer or other vehicle and withstand weather. For example, a box 130 installed in the bed of a pickup truck may be exposed to weather and/or other environmental elements such as rain, snow, sleet, hail, dirt, debris, etc., which can be very invasive. Without a bottom 206, these elements can become lodged underneath the container and have the potential, without a bottom or other covering, to render the unit inoperable. In certain examples, the container 130 is provided without a bottom 206 such that the front panel 203 slides under the base panel 131 and between the base panel 131 and an underlying vehicle bed or ground.

In certain examples, one or more handles 370 can be provided to allow a user to manipulate the container 130 to carry the container 130 and/or maneuver the container 130 into and out of a pickup bed, or trailer. Further, each panel can include a handle or handhold to help provide better ease of use to a user manipulating the container 130.

In certain examples, the container 130 provides a non-invasive attachment mechanism by which the weight of the container 130 itself (alone or in conjunction with a heavy bottom panel 206) is sufficient to hold the container 130 in position without having to attach the container to a vehicle using an external device such as screws, latches, ties, etc. Alternatively or in addition, the bottom panel 206 can include one or more holes 207, notches, and/or other recessions to accommodate hooks, latches, knobs, and/or other protrusions to keep the container 130 from moving in or on the vehicle bed, for example.

In certain examples, the side panels 204, 205 are designed with a tongue and groove shape on the edges that connect to the top and front panels. The tongue and groove arrangement has a dual purpose. A first purpose is to incorporate a "tortuous path" for incoming water or moisture that would get through any gap or crack remaining when two panels are connected. A second function of the tongue and groove is that their design (e.g., tapered) allows panels that are in the process of being connected to "index" at a point at which the panels first touch and then stay in alignment as the panels are continued to be brought together. Using a slight taper (e.g., wider at the bottom and narrower at the top in the case of the side/front connection and wider at the back and narrower at the front in the case of the side/top connection), as the panels come together, misalignment can be accommodated by the tapered tongue and groove.

Figure 6:
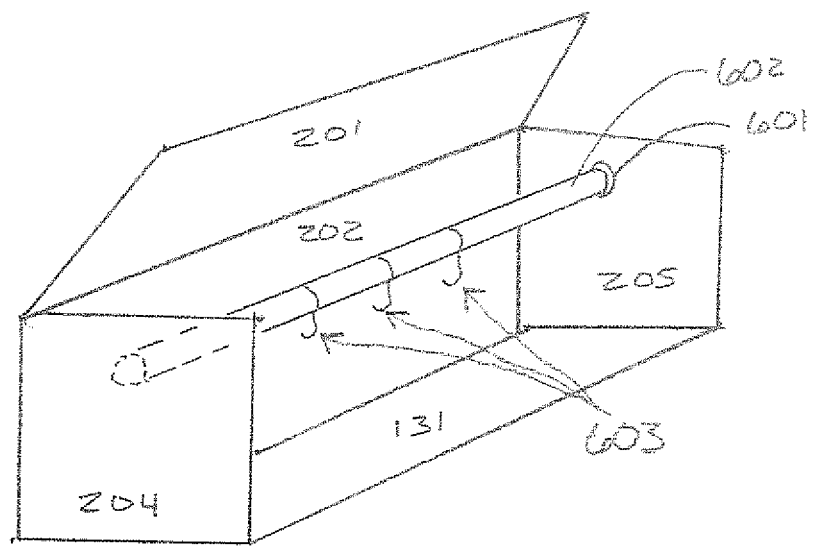
FIG. 6 illustrates an example storage container with a rod and hooks installed to hang personal items.

In certain examples, such as the example of FIG. 6, the side panels 204, 205 are designed with a cavity 601 near the top of the inside surface of each panel in which a pipe 602, rod, or other ridged device can be inserted. When inserted, the pipe 602 and/or other device provides a continuous connection across the container 130 (e.g., from side panel 204 to side panel 205). The pipe 601 and/or other device then functions like a closet rod, allowing a user to strap or hang personal items on the rod for transport inside the container 130.

As shown in FIG. 6, in certain examples, a series of hooks 603 can be attached to the pipe, rod, and/or other ridged device to allow sacks to hang from the hook without having to be strapped or tied to the pipe. A user can place a sack over a hook 603, and the sack can then swing freely rather than spilling and allowing items to roll around in the container 130.

In certain examples, one or more hinging devices including a circle cam disc, hook and ball, block or traditional hinge, can be used to facilitate movement of the front panel 203 with respect to the base 131. As previously described, the front panel 203 can slide under and/or into the gap created when the bottom 206 is attached to the base 131. For example, by sliding the front panel 203 underneath and/or into the gap caused by the separation of the base 131 and the bottom 206, the container 130 can be placed at or near the tailgate of a truck without worrying about the front panel 203 extending unsupported beyond the bed or tailgate of the truck (e.g., hanging in mid-air), which would be the case if the panel was not able to be stored under the base itself.

As demonstrated in FIG. 7, the side panels are formed from a metal and/or other hard material, the unit 130 can be locked when the top panel 201 is closed, and the front panel 203 is slid out from under the base 131 and nested next to the top panel 201 and side panels 204, 205. These locks 701, 702 can allow either the front panel 203 to remain locked and the top to open freely, or the top panel 201 to be locked and the front panel 203 to open freely, or in a third position where both the front panel 203 and the top panel 201 can open freely.

While certain examples utilize one or more trusses 170, 171, 172, 173 to provide support to the base of a storage container when the front door is slid out from under the base 131, other examples include a base 131 that provides its own support and does not need additional support (e.g., because the base is constructed from a material, such as a metal, hard plastic, etc., that is constructed of material stiff enough to span from side to side without added support. In certain examples, the front panel 203 slides under the base 131 and remains in alignment with the base 131 in an opening between the base panel 131 and a container bottom 206 without use of a truss.

In certain examples, the top 201 of the box 130 can be secured while allowing the front panel 203 to open and close independently of the top panel 201. Additionally, the front 203 of the box 130 can be secured while the top panel 201 is opened and closed.

Figure 9:
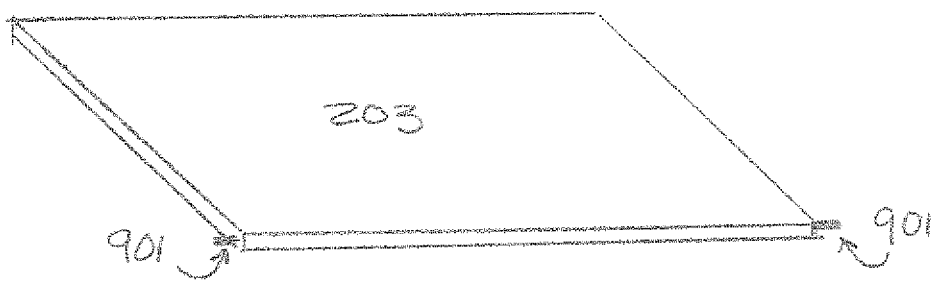
FIG. 9 illustrates an example of the pin location on the front panel to hold the panel in place in the corresponding slot or groove in the base.

In certain examples, the front panel 203 spans an entire length of a gap between the side panels 204, 205. Stiffness of the material from which the front panel 203 is made (e.g., metal, hard plastic, etc.) provides support for the movable panel 203 without guidance from trusses. In certain examples, such as an example shown in FIG. 9, one or more pins 901 are formed on the bottom of the front panel 203 near a side panel 204, 205 to guide movement of the panel 203 from the front of the container 130 to under the base 131 of the container 130. The pins 901 can slide in a slot that is closed on the end. The closed slot prevents the front panel 203 from being removed or dismounted from the container 130.

In certain examples, the top panel 201 is attached to the back panel 202 and is movable with respect to being hinged 209 to the back panel 202 (e.g., from a closed position "capping" the container 130 and touching the tops of the back 202, sides 204, 205 and front panel 203). The top 201 can be latched to the box 130 separately from the front panel 203 and the front 203 can be latched separately from the top 201. Thus, in certain examples, the front 203 can open while the top 201 is fixed and/or vice versa. In certain examples, when the top is closed and rests on the back 202, the front panel 203 is slid underneath the base 131.

As discussed above, certain examples provide a variety of devices to control the front panel 203 of the storage container 130 as the panel 203 slides out from under the base 131. The control(s) grab and constrain (e.g., stop, limit, etc.) the front panel 203 in position to swing vertically into place resting next to the side panels 204, 205 and top panel 201. A variety of approaches can be used to align the front panel 203 with the side panels 204, 205 and the base 131 as well as keep the front panel 203 from inadvertently being pulled out of the cavity created between the base 131 and a bottom 206 of the container 130. Several examples are disclosed and described below.

For example, one or more cam-shaped discs (e.g., circle cam discs, square cam discs, trapezoidal cam discs, etc.) and/or other object(s) having an offset center can be attached to the bottom of the front panel 203. The cam-shaped disc(s) and/or other object(s) can be attached near the end(s), side(s), and/or middle of the panel 203. A user can pull up on the front panel 203, and, based on the cam-shaped disc(s), the front panel 203 cannot come out of the box 130. Rather, the front panel 203 can only move up and down on a radius of the cam.

Figure 10:
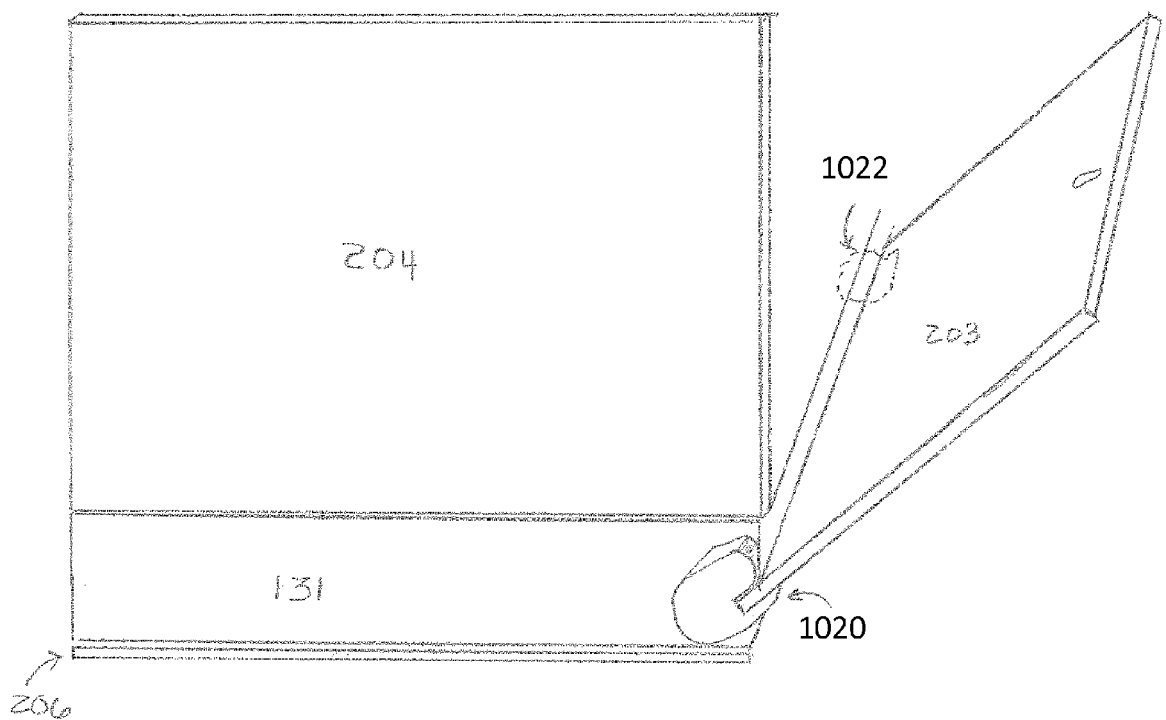
FIG. 10 illustrates an example storage container including cam shaped discs attached to a front panel.
Figure 11:
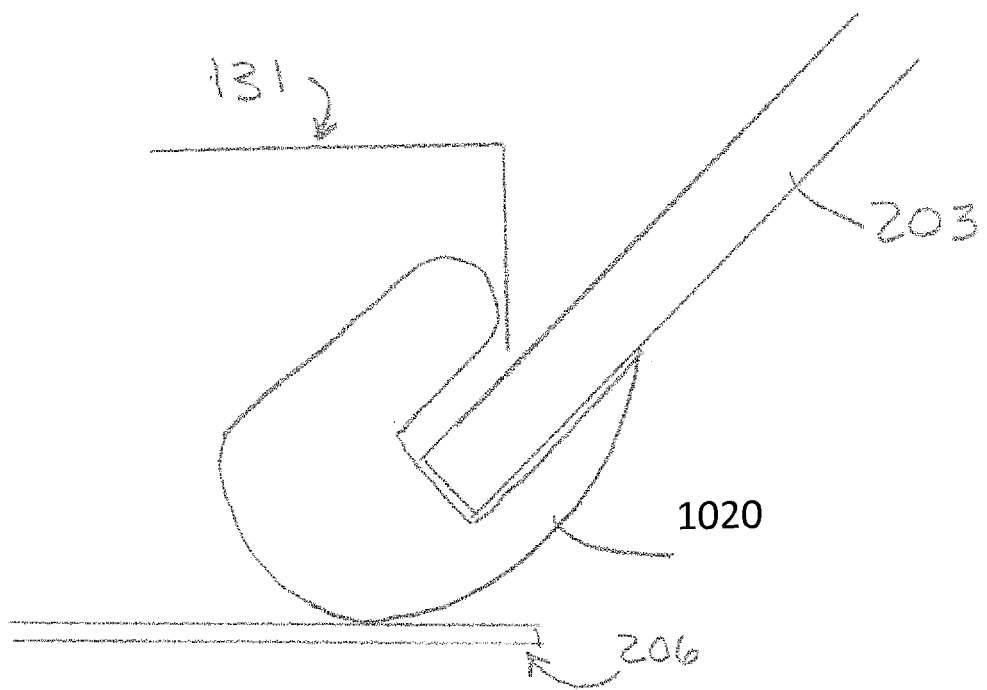
FIG. 11 illustrates an example of a cam shaped disc attached to a front panel that is in a position halfway between closed and open.
Figure 12:
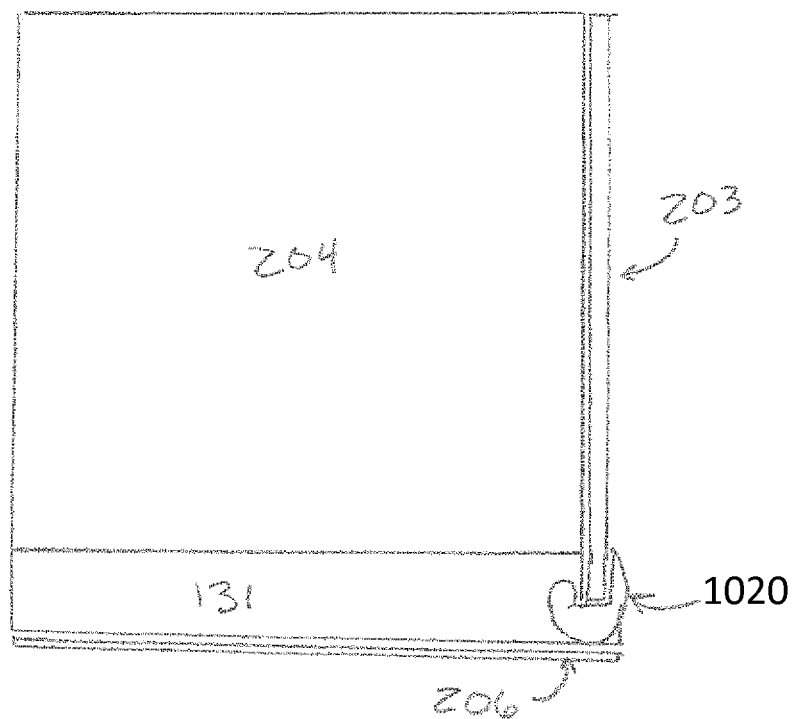
FIG. 12 illustrates an example storage container with a cam shaped disc attached to a front panel and the panel is in a fully closed position.

FIG. 10 illustrates an example of cam discs 1020, 1022 attached to a front panel 203. FIG. 11 illustrates the cam disc 1020 in an intermediate position (e.g., between closed and open). FIG. 12 shows the circle cam disc 1020 when the front panel 203 is tight against side panels 204, 205. Thus, in the example of FIG. 11, the front panel 203 is in a position halfway between closed and open, and, in the example of FIG. 12, the front panel 203 is in a fully closed position again the side panels 204, 205.

Figure 13:
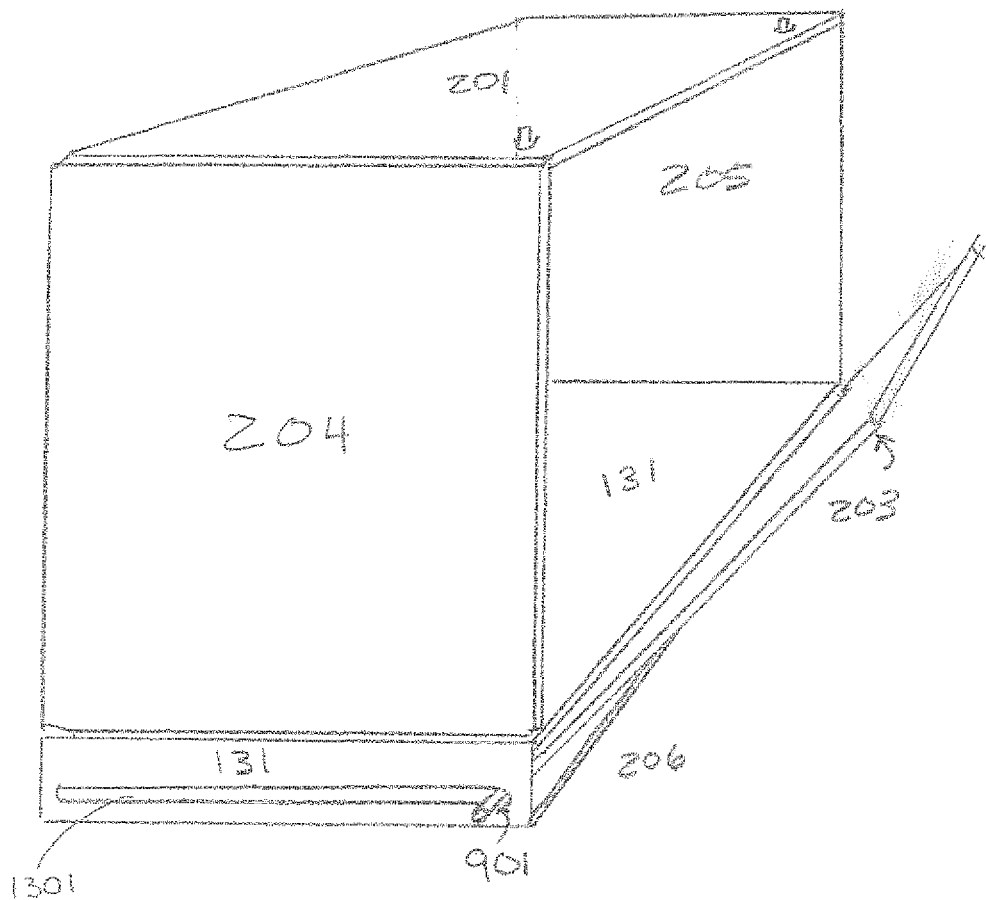
FIG. 13 illustrates an example storage container including a pin and groove guide for a front panel as the front panel relates to a base of the storage container.

Alternatively or in addition to the cam-shaped disc implementation, certain examples use a "pin and groove" to secure and move the front panel. FIG. 13 illustrates an example storage container with a pin and groove method of guiding the front panel 203 as it relates to the base 206. The front panel 203 in the example of FIG. 13 is in a position half way between open and closed.

FIG. 13 shows a pin 901 attached to a corner of the front panel 203. As illustrated in FIG. 13, the pin 901 slides in a slot or groove 1301 to move under and out from a base 131. FIG. 13 shows the example pin 901 position in the slot or groove 1301 when the front panel 203 is pulled out from underneath the base 131. Thus, the slot or groove 1301 allows the pin 901 to move in the slot or groove 1301 to keep the front panel 203 in correct position, for example.

FIG. 14 illustrates another alternative example using a hook and ball for movement of a front panel 203 with respect to a base 131. FIG. 14 illustrates an example storage container using a hook and ball method of guiding the front panel as it relates to the base. FIG. 14 illustrates the front panel 203 in three separate positions as the panel 203 is pulled out from under the base 131 and brought to a full vertical position where it can nest into the side and top panels.

As shown in the sequence of FIG. 14, a hook 1420 fits with respect to a spherical shaped elongated ball 1422 and allows the front panel 203 to pivot around the base panel 131. In this way, the front panel 203 can slide under the base 131 until the hook 1420 connects with the elongated ball 1422, at which point the front panel 203 swings up until it is in a position normal to the base 131.

Figure 15:
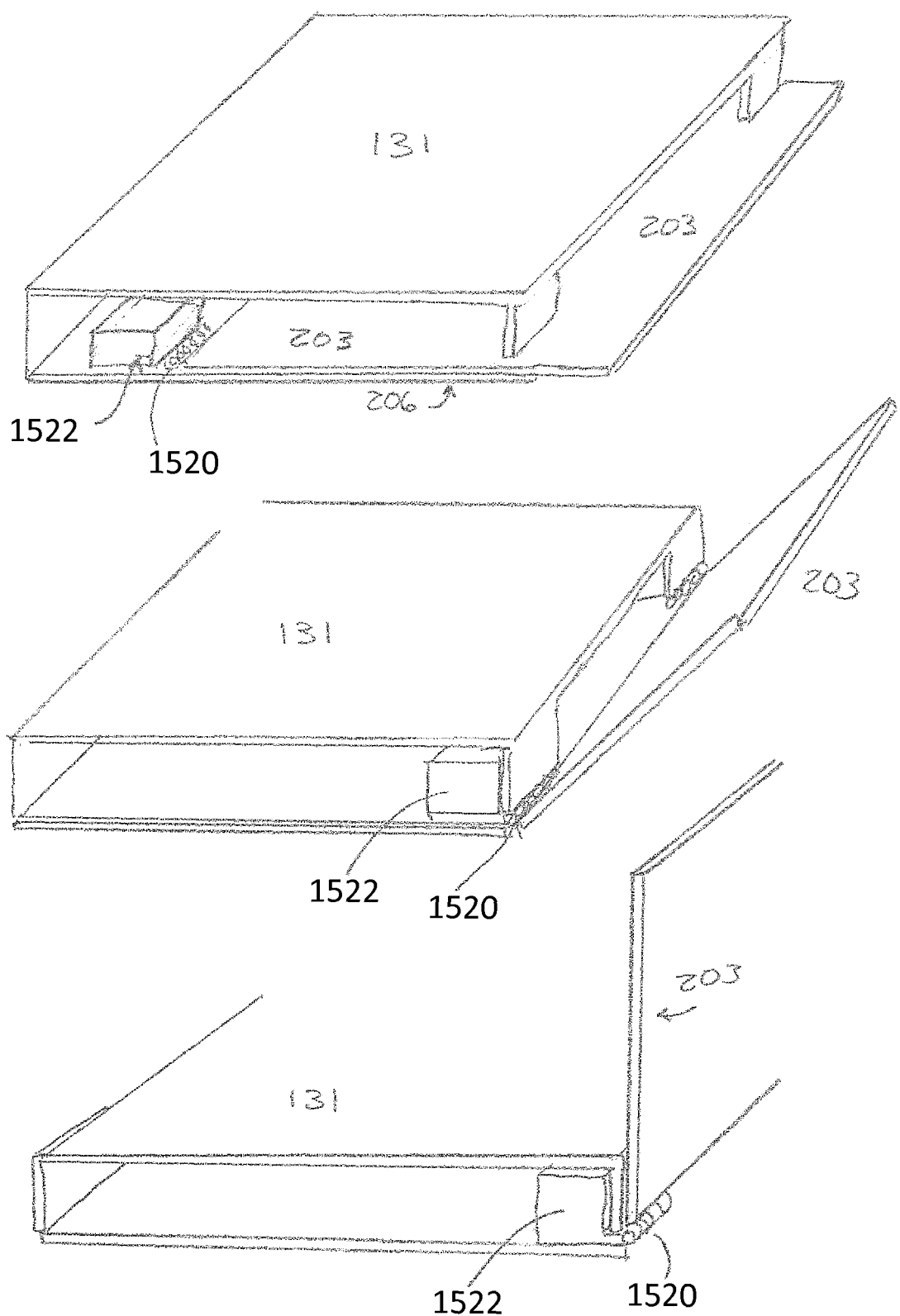
FIG. 15 illustrates an example storage container including a block and hinge guide for a front panel as the front panel relates to a base of the storage container.

FIG. 15 illustrates and example storage container using a block and hinge method of guiding the front panel 203 as it relates to the base 131. FIG. 15 illustrates the front panel in three separate positions as it is pulled out from under the base 131 and brought to a full vertical position where it can nest into the side and top panels.

FIG. 15 illustrates another alternative example using a block and hinge for movement of a front panel 203 with respect to a base 131 of a storage container. A hinge 1520 allows the front panel 203 to swing up with respect to the base 131, and a block 1522 prevents the front panel 203 from being pulled out of the base 131. Using the hinge 1520, the front panel 203 can be pulled up into an erected position normal to the base 131, while the block 1522 stops the panel 203 in position without moving the panel 203 beyond position.

In certain examples, the top of the container can be opened or closed, and the front and top panels are movable independent of each other (e.g., the top can be open and the front can be open, the top can be down and the front can be open, the top can be open and the front can be closed, etc.).

CONCLUSION

Thus, certain examples provide an automobile storage container constructed from a metallic or other rigid material. Certain examples provide a plurality of panels, arranged with respect to a base, that are connected to each other and configured to be movable so as to form an enclosed storage area on a bed of a vehicle, trailer, etc.

An example automobile storage container includes a plurality of panels arranged with respect to a base. The plurality of panels are interconnected to form an enclosed storage area when closed. The top and front panels are movable into both a closed position and an open position. The plurality of panels include at least a top panel, a front panel, a base panel, a back panel, and two side panels, the front panel movable to slide under the base of the container. The example includes a control device to grab and constrain the front panel in position to 1) swing vertically into a closed position against the side panels and base and to 2) keep the front panel from being pulled beyond a front edge of the base.

Thus, the top panel and front panel are independently movable with respect to each other, and each of the top panel and front panel is arrangeable in an open position and a closed position with respect to the rest of the container regardless of the open or closed position of the other of the top panel and front panel. For example, the top panel can move up into an open position or move down into a closed position regardless of whether the front panel is open or closed (or somewhere in between). Similarly, the front panel can slide down under the base panel into an open position or move up against the side panels into a closed position regardless of whether the top panel is open or closed (or somewhere in between).

While the inventions have been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from the spirit or scope of the present inventions. Therefore, it is intended that the inventions not be limited to the particular embodiments disclosed herein.

The invention claimed is:

1. An automobile storage container comprising:
    a plurality of panels including at least a top panel, a front panel, a back panel, two side panels, and a base panel; the top panel, front panel, back panel, and two side panels arranged with respect to the base panel; the plurality of panels interconnecting to form an enclosed storage area when all of the plurality of panels are in a closed position; the back panel and two side panels affixed with respect to the base panel; each of the top and front panels separately movable into both an open position and a closed position; the top panel pivotable with respect to the back panel to move between the open position and the closed position; the front panel movable to slide under the base of the container to arrange the front panel in the open position; and
    a control device to grab and constrain the front panel in position to 1) swing vertically into an erected position against the side panels and base panel and to 2) keep the front panel from being pulled beyond a front edge of the base panel,
    wherein the control device comprises a pair of cam-shaped discs attached to a bottom of the front panel to guide movement and position of the front panel with respect to the base panel of the container.

2. The container of claim 1, further comprising a bottom arranged below the base panel of the container, the base panel connected to the bottom to form a cavity between the base panel and the bottom, the cavity accommodating the front panel when the front panel is moved under the base panel.

3. The container of claim 2, wherein the control device is arranged to keep the front panel from inadvertently being pulled out of the cavity created between the base panel and the bottom of the container.

4. The container of claim 2, wherein the front panel spans an entire opening from side to side of the cavity created by the bottom and base panel of the container.

5. The container of claim 1, wherein the plurality of panels comprise at least one of plastic panels and metal panels.

6. The container of claim 1, wherein the automobile comprises at least one of a truck, an all-terrain vehicle, a recreational vehicle, or a trailer.

7. The container of claim 1, wherein the container is incorporated into a liner for the automobile.

8. The container of claim 1, wherein the container is configured for arrangement either horizontally or vertically in a bed of an automobile.

9. The container of claim 1, further comprising at least one of tapered latch hooks or rubber hooks connecting the top panel to the container.

10. The container of claim 1, further comprising at least one of tapered latch hooks or rubber hooks connecting the front panel to the container.

11. The container of claim 1, further comprising tongue and groove connecting panels of the container.

12. The container of claim 1, wherein the cam-shaped discs comprise at least one of circle cam discs, square cam discs, or trapezoidal cam discs.

13. The container of claim 1, wherein the control device further comprises a pin and groove alignment of the front panel and the base panel.

14. The container of claim 1, wherein the control device further comprises a hook and ball connecting and guiding the front panel with respect to the base panel.

15. The container of claim 1, wherein the control device further comprises a block and hinge connecting and guiding the front panel with respect to the base panel.

16. The container of claim 1, wherein the top panel is attached to the back panel such that the top panel is openable with respect to the back panel and side panels.

17. The container of claim 1, wherein the front panel comprises a lock to secure the container in the closed position.

18. The container of claim 17, wherein the top panel is movable to be opened or closed with respect to the back panel and side panels when the front panel is locked in the closed position.

19. The container of claim 1, wherein the front panel is movable when the top panel is in the open position and when the top panel is in the closed position, and wherein the top panel is movable when the front panel is in the open position and when the front panel is in the closed position.

20. An automobile storage container comprising:

a plurality of panels including at least a top panel, a front panel, a back panel, two side panels, and a base panel; the top panel, front panel, back panel, and two side panels arranged with respect to the base panel; the plurality of panels interconnecting to form an enclosed storage area when all of the plurality of panels are in a closed position; the back panel and two side panels affixed with respect to the base panel; each of the top and front panels separately movable into both an open position and a closed position; the top panel pivotable with respect to the back panel to move between the open position and the closed position; the front panel movable to slide under the base of the container to arrange the front panel in the open position; and a control device to grab and constrain the front panel in position to 1) swing vertically into an erected position against the side panels and base panel and to 2) keep the front panel from being pulled beyond a front edge of the base panel, wherein the control device comprises a hook and ball connecting and guiding the front panel with respect to the base.

* * * * *